United States Patent [19]
Sekiguchi et al.

[11] Patent Number: 5,848,134
[45] Date of Patent: Dec. 8, 1998

[54] METHOD AND APPARATUS FOR REAL-TIME INFORMATION PROCESSING IN A MULTI-MEDIA SYSTEM

[75] Inventors: Emiko Sekiguchi, Kanagawa; Naoya Kurami, Tokyo; Tadaharu Koga, Kanagawa, all of Japan

[73] Assignee: Sony Corporation, Japan

[21] Appl. No.: 789,083

[22] Filed: Jan. 27, 1997

[30] Foreign Application Priority Data

Jan. 31, 1996 [JP] Japan .................................. 8-015234

[51] Int. Cl.$^6$ .................................................. H04M 11/00
[52] U.S. Cl. ..................................... 379/93.15; 379/93.08
[58] Field of Search ........................... 379/93.01, 93.08, 379/93.09, 93.11, 93.14, 93.15, 93.24, 93.25, 93.28–93.34, 93.37, 100.13, 88, 89

[56] References Cited

U.S. PATENT DOCUMENTS

| | | | |
|---|---|---|---|
| 4,837,798 | 6/1989 | Cohen et al. | 379/93.15 |
| 4,998,248 | 3/1991 | Matsuzaki | 379/93.11 |
| 5,146,488 | 9/1992 | Okada et al. | 379/89 |
| 5,276,731 | 1/1994 | Arbel et al. | 379/88 |
| 5,317,628 | 5/1994 | Misholi et al. | 379/89 |

*Primary Examiner*—Wing F. Chan
*Attorney, Agent, or Firm*—Limbach & Limbach L.L.P.

[57] ABSTRACT

A message is exchanged on a real-time basis between a computer and a telephone. A system server converts a message from terminals of a plurality of different media, such as a computer and telephone, into data respectively compatible with the telephone and the computer, and then sends the data to the telephone and the computer, respectively.

8 Claims, 7 Drawing Sheets

FIG. 6
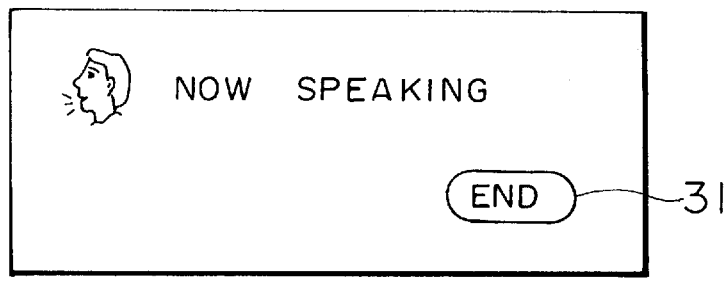
(PERMITTED TO CONTINUE SPEAKING UNTIL THE PRESSING OF THE END BUTTON)
(A) SPEECH SCREEN
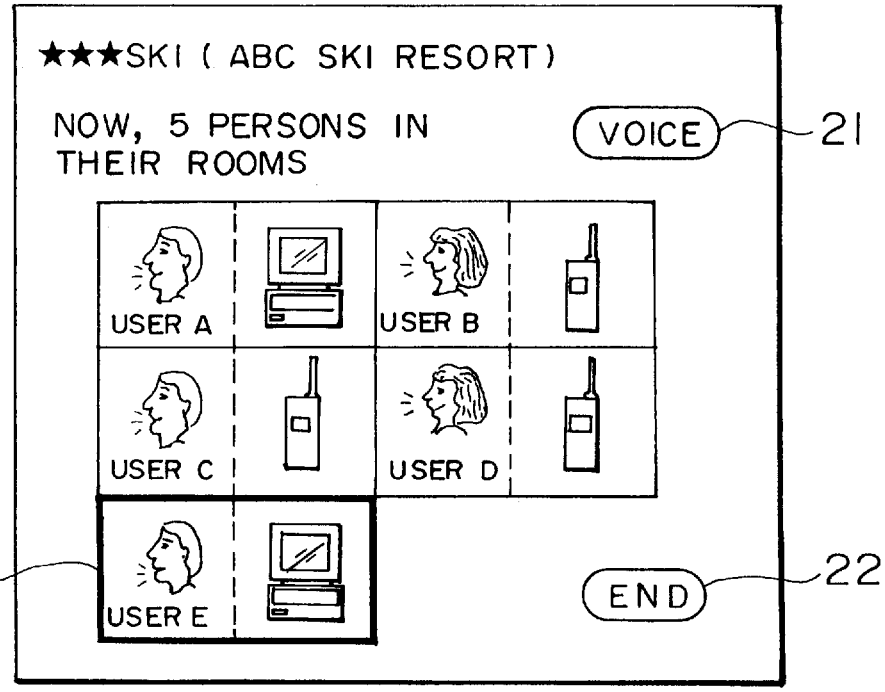
(B) CONFERENCE ROOM SCREEN

METHOD AND APPARATUS FOR REAL-TIME INFORMATION PROCESSING IN A MULTI-MEDIA SYSTEM

BACKGROUND OF THE INVENTION

1. Field of the Invention

The present invention relates to a method and apparatus for processing information. More specifically, the present invention relates to a method and apparatus that allow messages to be exchanged on a real-time basis between terminals of a plurality of media, such as a mix of computers and telephones.

2. Description of the Related Art

A telephone exchanges a message in the form of voice on a real-time basis (converses) with another telephone that is one terminal of the same media. Recently, some services are available which allow three parties to participate simultaneously in a telephone conversation.

Available in computer communications field are services that allow chatting (on-line talk) and a real-time electronic conference. Using such a service, a text or message is exchanged on a real-time basis among two or more computers.

While a real-time message exchange is performed on the terminals belonging to the same media, for example, on a telephone to telephone or computer to computer link, a real-time message exchange is conventionally difficult between a telephone and a computer.

It will be advantageous if a real-time message exchange is performed between a telephone and a computer.

SUMMARY OF THE INVENTION

Accordingly, it is an object of the present invention to provide a method and apparatus which allow a real-time message exchange even between terminals of different media types.

To achieve the above object, the information processing apparatus of the present invention comprises communications means for communicating with a terminal of a first media and a terminal of a second media, memory means for storing terminal information about a plurality of terminals which transmit and receive messages, converter means for converting a message received from the first media terminal through the communications means into data in a data format of the second media terminal, and for converting a message received from the second media terminal through the communications means into data in a data format of the first media terminal, and control means for converting the message transmitted from one of the first media terminal and the second media terminal, using the converter means, and for transmitting a message to the other of the first media terminal and the second media terminal, in the data formats respectively compatible with the other of the first media terminal and the second media terminal, based on the terminal information stored in the memory means.

The message transmitted from the first media terminal and the message transmitted from the second media terminal are respective voice messages different in data format, and the converter means converts the voice message from the first media terminal and the voice message from the second media terminal into a voice message in the data format of the second media terminal and a voice format in the data format of the first media terminal, respectively.

The message transmitted from the first media terminal and the message transmitted from the second media terminal are a message of text data and a voice signal, respectively, and the converter means converts the message of text data from the first media terminal into a message in a voice data format compatible with the second media terminal while converting the voice signal from the second media terminal into a message in the text data format compatible with the first media terminal.

When one of the first media terminal and the second media terminal is provided with a display device, the control means recognizes, based on the terminal information stored in the memory means, the number of terminals which transmit and receive the message, and controls the communication means to transmit communication status data for presenting on the display device a screen indicating the number of terminals, to the one of the first media terminal and the second media terminal having the display device.

The communication status data comprises character image data representing the terminal of a user who transmits and receives the message.

The character image is set by the user.

The first media terminal and the second media terminal are a computer and a telephone, respectively.

An information processing method for performing a process to allow terminals of a plurality of media types to transmit and receive a message comprises the steps of storing terminal information about terminals which transmit and receive a message, converting the messages from the first media terminal and the second media terminal into messages in data formats of the second media terminal and the first media terminal, respectively and, to transmit a message coming from one of the terminals to the other terminals, transmitting the message in the data formats respectively compatible with the other terminals, based on the terminal information.

BRIEF DESCRIPTION OF THE DRAWINGS

FIG. 6 shows a speech screen and a conference room screen.

DESCRIPTION OF THE PREFERRED EMBODIMENTS

Figure 1:
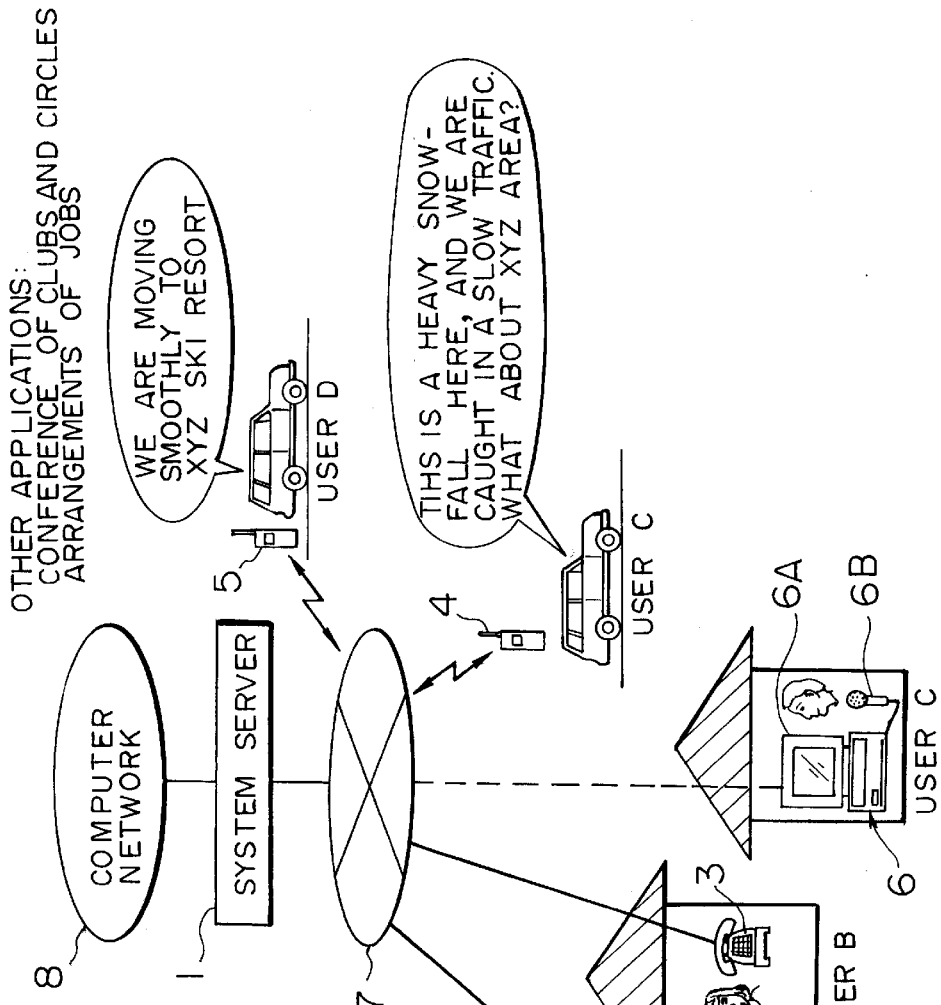
FIG. 1 is a block diagram of a network system of the present invention.

FIG. 1 shows the organization of a network system of the present invention. A system server 1 is connected to a public network (a telephone network, for example) 7 and a computer network (the Internet, for example) 8, receives a message sent from any of the terminals that have access to the public network 7 and the computer network 8, and transmits a message to all other terminals. A real-time message exchange is thus performed between terminals. Suppose that the system server 1 transmits or sends a message from a terminal A to another terminal B. When the terminals A and B are different in media type from each other, the system server 1 converts a data format of the message from the terminal A into data in another data format compatible with that of the terminal B media, and then transmits the message to the terminal B. The exchange of a message between terminals of different media is performed in this way.

The system server 1 thus offers a chatting service and real-time electronic conference service that allow messages to be exchanged on a real-time basis between terminals of a plurality of media types. The chat service or the real-time electronic conference service provided by the system server 1 is aimed at a meeting that is held through a mix of a plurality of media, and the service provided according to the method and apparatus for processing information of the present invention is referred to as a "media mix meeting service" throughout this specification.

In an embodiment shown in FIG. 1, each of users A, B, C and D accesses the system server 1 using a personal computer (more simply referred to as a computer) 2, a telephone 3, portable telephones 4 and 5, respectively, through the public network 7 and a message exchange among these terminals (computer 2, telephone 3, portable telephones 4 and 5) is performed. The system server 1 is accessed by users A and B, at home, and users C and D, in their respective moving cars.

The computer 2, equipped with a microphone 2B, converts a voice message into a voice signal as an electrical signal when the user A talks to the microphone. The computer 2 converts the voice signal into a computer data format. Specifically, the voice signal is A/D converted into a digital voice signal (voice data) in the computer 2. The computer 2 further subjects the voice data to a desired compression process, and then outputs voice data of computer data format (hereinafter referred to as computer voice data). The computer voice data is sent to the system server 1 via the public network 7.

The system server 1 stores terminal information (about the number of terminals where message exchange is going on, and the type of media of each terminal) to manage the terminals (the computer 2, telephone 3 and portable telephones 4 and 5) which transmit and receive message. When the system server 1 receives a message in the form of the computer voice data from the computer 2, it recognizes the terminals other than the computer 2, namely, the telephone 3, and the portable telephone 4 and 5 by referring to the terminal information, and sends the message from the computer 2 to these terminals.

Since the telephone 3 and the portable telephones 4 and 5 cannot receive the message in the computer voice data as it is, the system server 1 converts the message in the computer voice data into a message in a telephone data format. Specifically, the system server 1 subjects the computer voice data to a decompression process and then a D/A conversion process. The computer voice data is thus converted into voice data (voice signal) in the telephone data format (the voice data in the telephone data format is also referred to as telephone voice data), and then sent to the telephone 3 and the portable telephones 4 and 5 through the public network 7.

The telephone 3 and the portable telephones 4 and 5 receive and then output the telephone voice data. The users B through D can hear the sound message the user A sent using the computer 2.

When the user B speaks, his or her voice is converted to the voice signal (telephone voice data) by the telephone 3, and is then transmitted to the system server 1 via the public network 7. When the system server 1 receives the message in the telephone voice data, it recognizes the terminals other than the telephone 3, namely the computer 2 and the portable telephones 4 and 5 by referring to the terminal information, and sends the message from the telephone 3 to these terminals.

In this case, the telephone voice data can be received by the portable telephones 4 and 5, but not by the computer 2. The system server 1 converts the message in the telephone voice data into a message in the computer voice data format. Specifically, the system server 1 subjects the telephone voice data to an A/D conversion process and then to a predetermined compression process, and then outputs computer voice data. As a result, the telephone voice data from the telephone 3 is sent to the portable telephones 4 and 5, and the computer voice data derived from the telephone voice data is sent to the computer 2, respectively, via the public network 7.

The computer 2 receives the computer voice data from the system server 1. In the computer 2, the computer voice data is decompressed, and then D/A converted into a voice signal. Further in the computer 2, the voice signal is output through a built-in loudspeaker, and thus the user A can hear the message in sound the user B talks.

As described above, the system server 1 performs conversion between computer voice data and telephone voice data. For computer voice data, a technique under the Internetphone(trademark) of Vocal Tec may be employed.

The portable telephones 4 and 5 receive the telephone voice data from the system server 1 and output the message in sound. The users C and D thus hear the message the user B sends.

When the user C speaks, the portable telephone 4 converts the voice message into a voice signal (telephone voice data), which is then sent to the system server 1 via the public system 7. Upon receiving the message in the telephone voice data format from the portable telephone 4, the system server 1 recognizes the terminals other than the portable telephone 4, namely the computer 2, the telephone 3 and the portable telephone 5, referring to the terminal information stored in the system server 1, and sends the message from the portable telephone 4 to these terminals.

The telephone 3 and the portable telephone 5 can receive the telephone voice data but the computer 2 cannot. The system server 1 thus converts the message in the telephone voice data format into a message in the computer voice data format. The telephone voice data from the portable telephone 4 is sent to the telephone 3 and the portable telephone 5, and the computer voice data derived from the telephone voice data is sent to the computer 2, respectively via the public network 7.

The users A, B and D thus hear the voice message the user C speaks in the same manner as the preceding cases.

In the same way, the user D speaks a voice message and the portable telephone 5 converts the voice message into telephone voice data. The system server 1 works in much the same way the portable telephone 4 gives the telephone voice data. The users A through C thus hear the voice message the user D speaks.

The system thus constructed allows a real-time media exchange (also referred to as media mix meeting) to be performed between terminals of different types of media through the system server 1.

The system server 1 is provided with a common space (hereinafter referred to as meeting room) available for a media mix meeting on a theme-by-theme basis, like an electronic conference room in computer communications. Each user can enjoy the media mix meeting service for each theme in the meeting room assigned to a theme of user's interest.

In this embodiment, a message is exchanged in voice, and thus the meeting room may be called a voice meeting room.

The system server 1 stores, as the terminal information, the number of terminals that participate in message exchange in each meeting room (voice meeting room), and recognizes the number of terminals (users) based on the terminal information. Specifically, the system server 1 is designed to recognize how many users make access to each meeting room.

In addition to recognizing the number of users who make access to each meeting room, the system server 1 stores character images (also referred to as user character) indicative of a user who makes access to the meeting room, and further stores information indicative of the media type of the terminal each user employs. The system server 1 thus produces communication status data indicating the communication status in each meeting room.

The system server 1 transmits the communication status data to any terminal which is provided with a display device having information display capability.

In the embodiment shown in FIG. 1, the computer 2 has a display device 2A such a CRT or an LCD, and thus the system server 1 transmits the communication status data to the computer 2. The communication status data is received by the computer 2 and then presented on the display device 2A. The user A thus recognizes the number of users accessing to each meeting room, and the types of user terminals that participate in the media mix meeting in each meeting room.

If the telephone 3 and the portable telephones 4 and 5 have their respective display devices, the communication status data is presented on screen on these terminals in the same manner as in the computer 2. If the telephone 3 and the portable telephones 4 and 5 have no display devices, the system server 1 produces and transmits a voice signal telling the number of users accessing to each meeting room, as appropriate. Listening to the voice, the users B through D can know the number of users who access each meeting room.

In the embodiment shown in FIG. 1, the display device 2A on the computer 2 presents the communication status data on screen, which includes the listing of the number of users who access the meeting rooms. As shown, participating users are 4 persons, 5 persons, 3 persons, and 3 persons for themes "ski," "music," "movie," and "musical," respectively. The users A through D are now accessing to the meeting room assigned to the theme "ski." The communication status screen presents the characters of the users A through D in the meeting room "ski" and the type of the terminal ("PC" representing a computer and "TEL" representing a telephone) each user now uses.

In the meeting room with the theme "ski" in the embodiment shown in FIG. 1, users A and B, both at home, ask users C and D about the conditions of a ski resort (or its vicinity), and users C and D answer the questions. The user A and B, at home, can know the actual conditions of the ski resort.

In the embodiment shown in FIG. 1, the computer 2 is connected to the public network 7. Alternatively, the computer 2 may be connected to a computer network 8 without any problem, because data communications between the system server 1 and the computer 2 is performed in computer voice data format.

Figure 2:
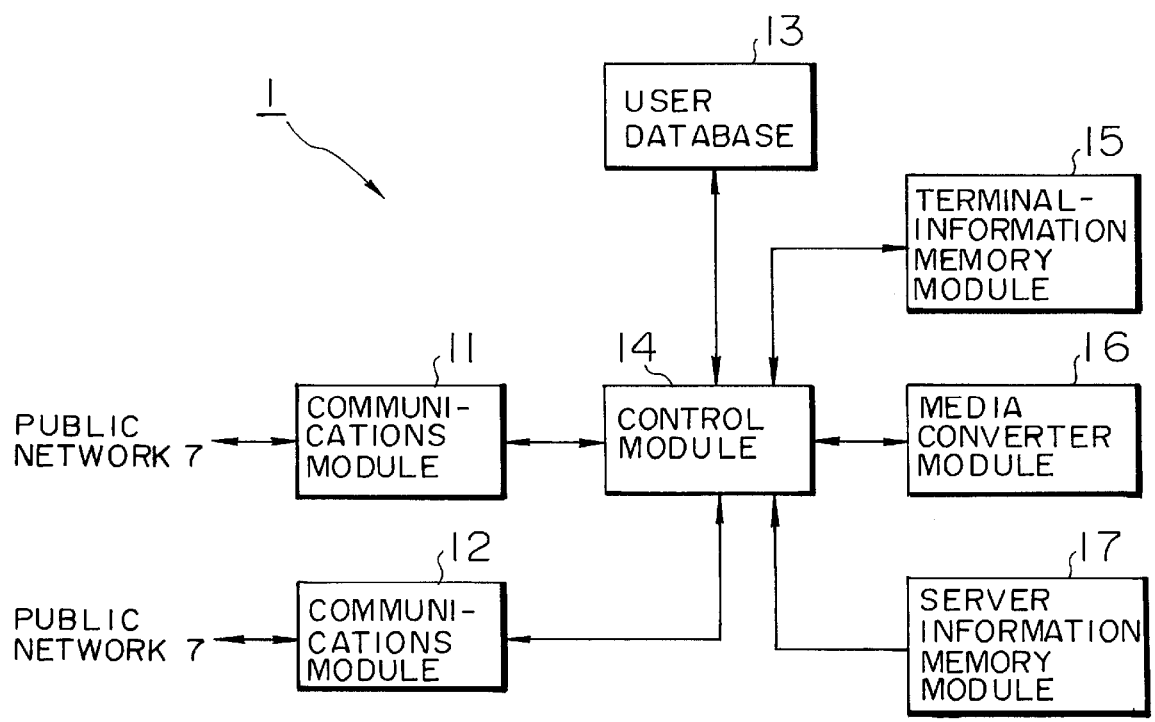
FIG. 2 is a block diagram of a system server 1 of FIG. 1.

FIG. 2 is a block diagram of the system server 1 of FIG. 1. When communications module 11 or 12 is accessed by a terminal, each establishes a communication link to the terminal, and performs a required control to carry out a communication with the terminal. The communications 11 and 12 are designed to communicate with their respective predetermined media terminals. Specifically, the communications 11 and 12 are designed to communicate with the computer and telephone, respectively. The user A with the computer 2 (also a user E having a computer 6 to be described later) accesses the communication module 11, and the users B, C and D having the telephone 3 and the portable telephones 4 and 5, respectively, access the communication module 12.

By using different communications modules in response to different types of media, the system server 1 can recognize the media of each terminal.

A user database 13 stores user information of each user and the ID (identity) and password cross-referenced to the user.

To use the media mix meeting service through the system server 1, a user needs to contract with a provider who provides the service, and the provider issues an ID and password to the user who has contracted. When the user contracted, the user character to be presented on the communication status screen is assigned to the user as user information. The user database 13 stores the above information cross-referenced to the ID and password.

The user character is image data that symbolizes each user. Several pieces of image data for user characters are prepared in advance at the system server 1, and a user selects one of them to register it at the user database 13. Alternatively, a user may produce a character to his or her preference using any graphics application, and send it to the system server 1 to register it at the user database 13. Furthermore, a user's own picture may be digitized, sends the digitized data to the system server 1 to register it at the user database 13. In other words, the user character is freely set at the option of the user.

Referring to the user database 13, terminal-information memory 15 and server-information memory module 17, a control module 14 controls the communications module 11, 12 and a media converter module 16 to provide the medeia mix meeting service.

The terminal-information memory 15 stores, as the terminal information of each terminal participating in message exchange, unique information for identifying the terminal, the user ID of a user who accesses through the terminal, the media type information of the terminal (in FIG. 1, indicating whether the terminal is a computer or a telephone), and the user character data corresponding to the user ID of the user who owns the terminal.

When a terminal accesses a meeting room, the control module 14 assigns a unique number to the terminal, and outputs it as unique information to the terminal-information memory 15. The control module 14 recognizes or determines the type of media of the terminal depending on whether the terminal makes access through the communications module 11 or 12 (in this embodiment, when the access is performed through the communications module 11 or 12, the media is determined to be a computer or a telephone, respectively), and outputs its determination result to the terminal-information memory 15. The control module 14 reads from the user database 13 the data of the user character corresponding to the user ID of the terminal of the user who makes access, and outputs it to the terminal-information memory 15. The terminal-information memory 15 stores the output of the control module 14 as the terminal information. One method for converting the media of data in this way is disclosed in Japanese Examined Patent Publication No. 7-105848.

The media converter module 16 converts data under the control of the control module 14. Specifically, the media converter module 16 performs conversion between telephone voice data and computer voice data. The media converter module 16 further converts the terminal information stored in the terminal-information memory module 15 into the communication status data and telephone voice data. The media converter module 16 also converts the information stored in the server-information memory module 17 into the telephone voice data and computer display data. The media converter module 16 has a voice synthesizing function, and thus when the information stored in the server-information memory module 17 is sent to the telephone, the information is converted into telephone voice data through a voice synthesizing processing.

The server-information memory module 17 stores a message transmitted to a terminal from the system server 1, such as a guidance for media mix meeting service, namely, information (server information) required to provide media mix meeting service.

Figure 3:
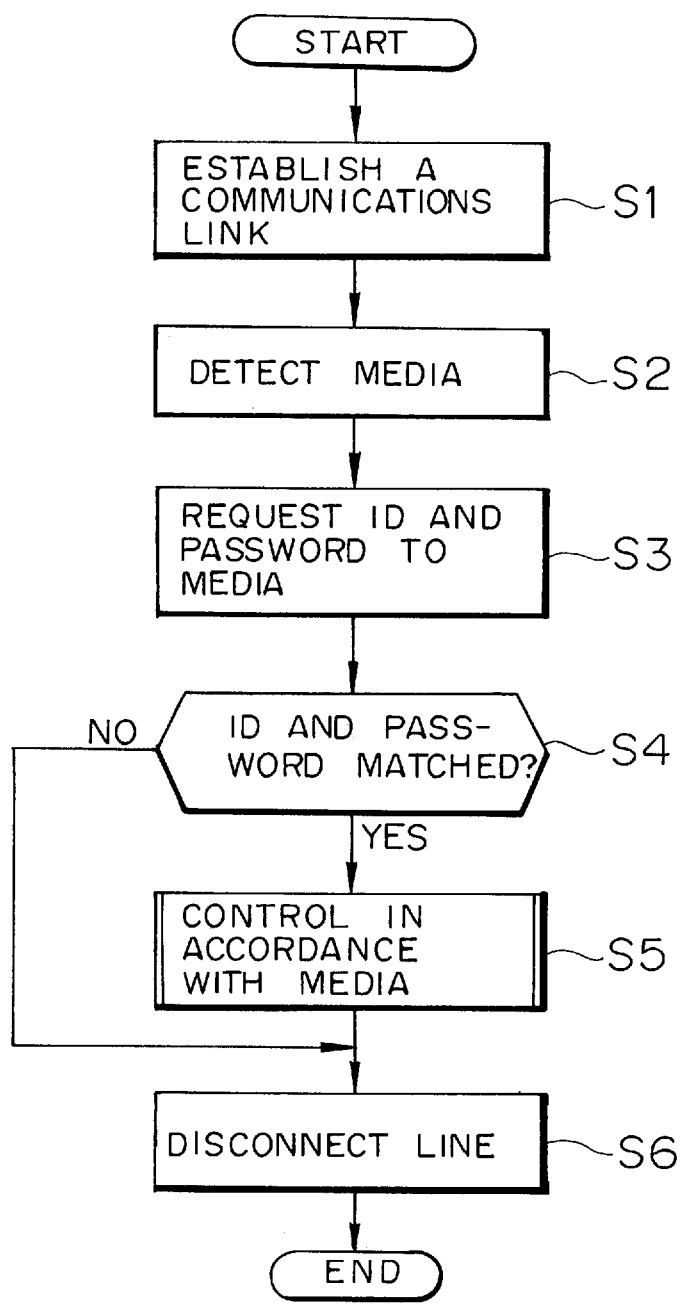
FIG. 3 is a flow diagram illustrating the operation of the system server 1 of FIG. 2.

Referring to a flow diagram shown in FIG. 3, the operation of the system server is discussed. When the communications module 11 or 12 in the system server 1 is accessed by a terminal, the communications module 11 or 12 establishes a communication link to the terminal at step S1. The sequence goes to step S2, where the control module 14 determines the media type of the terminal based on whether the communications module 11 or 12 established a communication link with the terminal. At step S3, the control module 14 sends to the terminal a message requesting the user ID and password through the communications module 11 or 12 depending on the media type determined at step S2.

When the terminal is a computer, the control module 14 reads, from the server-information memory module 17, the information of a message requesting the user ID and password, and converts it into telephone voice data or display data by controlling the media converter module 16. The message converted into the telephone voice data or display data is now transmitted.

The user hears or sees the message transmitted, and enters the user ID and password assigned at the contract, by operating the terminal. The ID and password are sent to the system server from the terminal. When the communications module 11 or 12 receives the ID and password from the terminal, the control module 14 determines whether the combination of the ID and password is as registered in the user database 13, at step S4.

At step S4, when the ID and password transmitted from the terminal are found to be unregistered in the user database 13, namely, when that access is not the one from a contract user, the sequence goes to step S6. The control module 14 reads, from the server-information memory module 17, a message indicating that the ID and password are invalid, and converts it into a data format compatible with the terminal by means of the media converter module 16 in the same manner as at step S3. By controlling the communications module 11 or 12, the control module 14 sends the message to the terminal and disconnects the link with the terminal to end the sequence.

At step S4, when the ID and password transmitted from the terminal are found to be registered in the user database 13, the sequence goes to step S5. The control module 14 performs control required to provide the media mix meeting room service according to the media type determined at step S2. When the control module 14 receives from the terminal a signal indicating the end of one service session, the sequence goes to step S6, where the control module 14 disconnects the line with the terminal to end the sequence.

Figure 4:
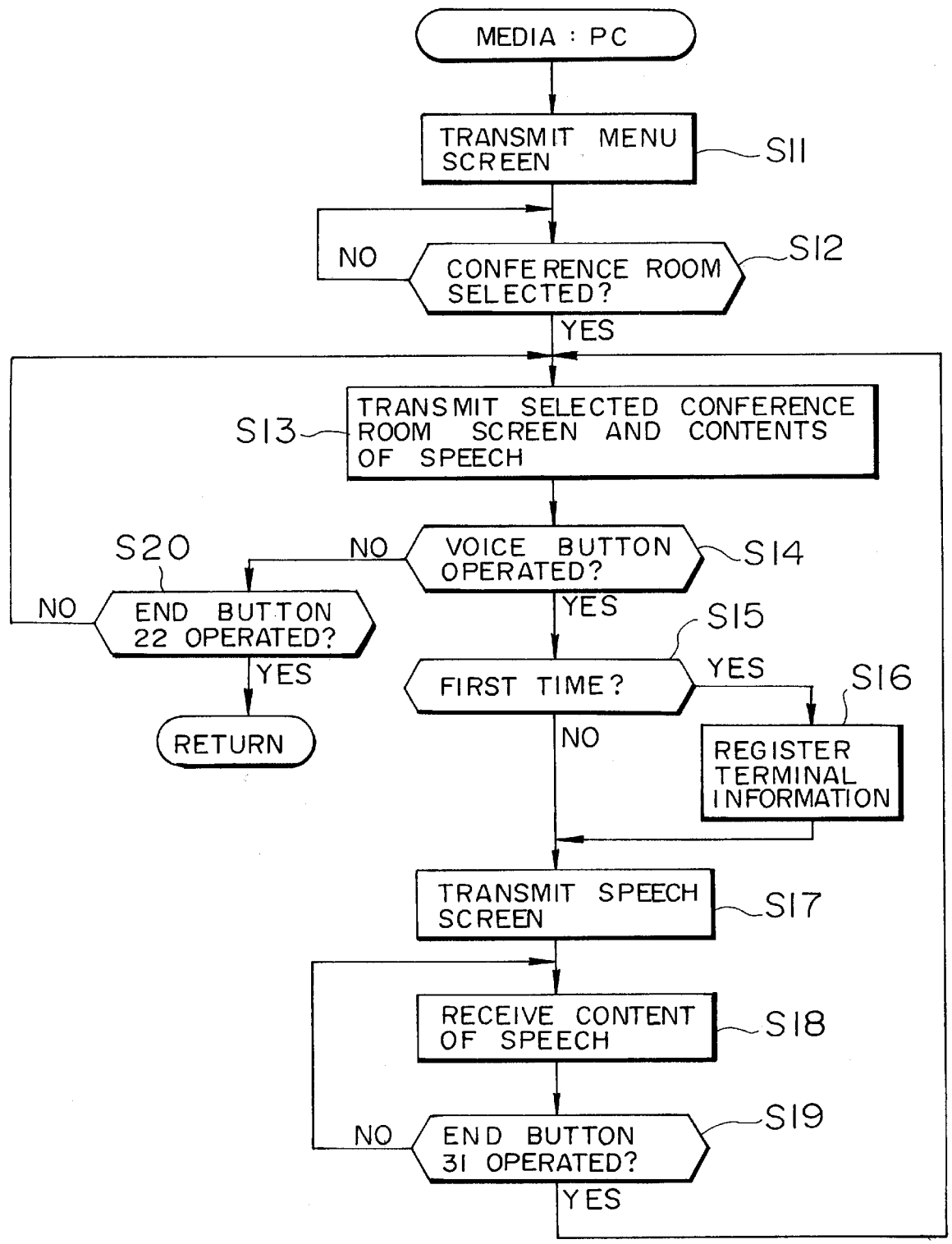
FIG. 4 is a flow diagram illustrating the detail of a step S5 of FIG. 3.

The processes at step S5 in FIG. 3 for computer terminal and telephone terminal cases are now separately detailed. Referring to a flow diagram shown in FIG. 4, the computer terminal case is discussed first.

As already described with reference to FIG. 1, the user A having the computer 2, the user B having the telephone 3, and the users C and D having their respective portable telephone 4 and 5 are accessing the meeting room in connection with "ski (ABC ski resort)" (namely participating in conversation). Suppose that in the course of conversation, a user E having a computer 6 with a display device 6A and a microphone 6B is accessing as shown by a dotted line in FIG. 1.

The control module 14 first reads, from the server-information memory module 17, the type of meeting room (type of theme) stored as the server information, and determines the number of users now accessing to each meeting room referring to the terminal-information memory module 15. From these pieces of information, the control module 14 produces data that make up a menu screen that is one of the communication status screens, and converts these data into display data by controlling the media converter module 16. At step S1, the menu data in the display data format is sent to the computer 6 via the communications module 11 (because any access from a computer is received by the communications module 11).

Figure 5:
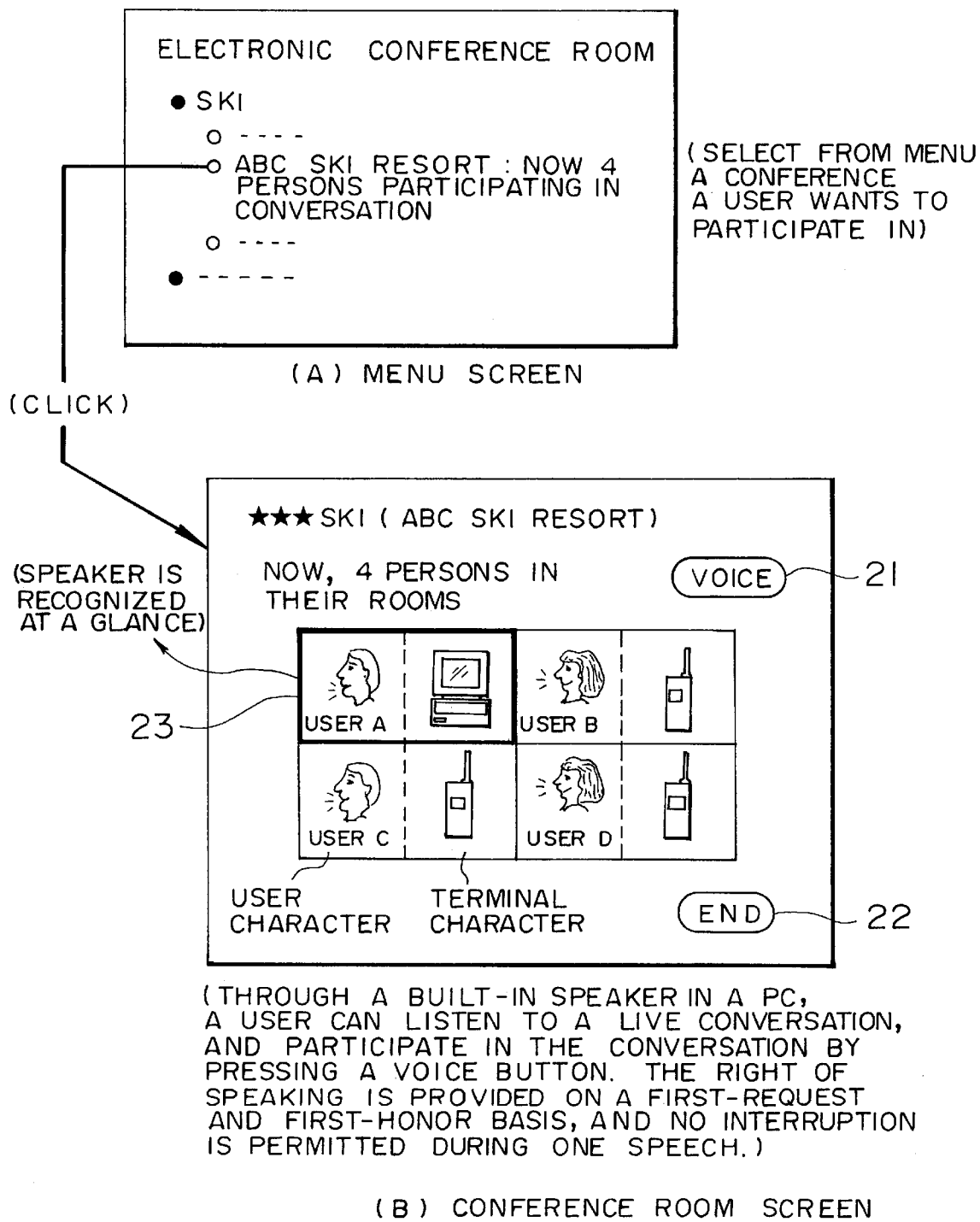
FIG. 5 shows a menu screen and a conference room screen.

The computer 6 receives the menu data, and its display device 6A presents, as shown in FIG. 5A, for example, a menu screen that includes the type of meeting room (electronic conference room) and the number of users accessing to this meeting room.

From the menu screen, the user E selects a meeting room in which the user E wants to participate. The user E, for example, selects the desired meeting room by clicking anywhere inside the display area of the desired meeting room, for example, with an unshown mouse. When the user E selects the meeting room, the selection signal corresponding to the user E's selection is sent from the computer 6 to the system server 1.

After sending the menu data at step S11, the control module 14 in the system server 1 determines at step S12 whether the user E selects the meeting room (conference room). The determination at step S12 shows that no meeting room is selected, step S12 is repeated. When the determination at step S12 reveals that the meeting room is selected, namely, when the communications module 11 receives the selection signal from the computer 6, the sequence goes to step S13. The control module 14 controls the communications module 11 to send to the computer 6 the data indicative of the meeting room screen. The data indicative of the meeting room screen is the communication status data indicative of communication status in the meeting room (selected by the user E) corresponding to the selection signal.

The control module 14 recognizes the user who is accessing to the meeting room corresponding to the selection, referring to the terminal information stored in the terminal-information memory module 15. The control module 14 reads from the terminal-information memory module 15 the data of the user character of the user who is accessing to the meeting room corresponding to the selection signal. Furthermore, the control module 14 reads, out of the server information stored in the server-information memory module 17, the information required to make up a conference room screen (for example, on-screen buttons and image data representing the type of media). The control module 14 produces the data that make up the conference room screen, and converts the data into display data by controlling the media converter module 16. At step S13, the data for the conference room screen arranged in the display data is transmitted to the computer 6 via the communications module 11.

The computer 6 receives the data for the conference room screen and presents it on the display device 6A as shown in FIG. 5B.

The conference room screen shown in FIG. 5B is a screen of a meeting room in connection with "ABC ski resort." Presented on top of the screen is a title "★★★★ ski (ABC ski resort)" under which a message "now, 4 persons in their rooms" is shown to indicate that 4 persons (users A through D) are now accessing to the meeting room. Shown below that message are the user characters of the user A through D along with their respective images (hereinafter referred to as terminal characters) indicating their terminals in use (in the embodiment shown in FIG. 5B, the user character of each user is partitioned from its terminal character by a dotted line).

In this way, the user E can easily monitor what users (users A through D in this embodiment) access to the meeting room and what types of media they are now using.

Available on the conference room screen are a voice button 21, an end button 22, and a partition 23. The voice button 21 is operated (clicked) to speak in the meeting room (to transmit a voice message). The end button 22 is operated to leave the meeting room (to disconnect the link from the system server 1). The partition 23 will be described later.

In the system server 1, the communications modules 11 and 12 receive the voice message from the terminals (the computer 2, telephone 3 and portable telephones 4 and 5), and the control module 14 converts the voice message received through the communications modules 11 or 12 into telephone voice data or computer voice data, as required, by controlling the media converter module 16. The control module 14 recognizes the users who are accessing to the same meeting room, referring to the terminal-information memory module 15. When receiving a voice message from one of the users or a voice data in different data format from another user, the control module 14 controls the communications modules 11 and 12 so that the received voice message is transmitted to the rest of user terminals. Voice message exchange is performed in this way mutually among the users A through D having the computer 2, the telephone 3 and the portable telephones 4 and 5, respectively.

At step S13, the control module 14 transmits a conference room screen to the terminal (computer 6) which sent the selection signal for the meeting room at step S12. Furthermore, the control module 14 causes the communications module 11 or 12 to send a voice message from a user terminal which accesses to the selected meeting room in the same manner as already described. By selecting the meeting room (to which users A through D access) at step S12, the user E can hear the speech content (voice message) by users A through D who are accessing to the meeting room.

The computer 6 has the built-in loudspeaker as the computer 2, and outputs the voice from the system server 1 through the loudspeaker.

The partition 23 shown in FIG. 5B encloses the user character and terminal character of a user who is just speaking. In this case, the user character and terminal character of the user A are enclosed by the partition 23, and thus the user A is now speaking (the user A is a talker). Namely, the voice output from the loudspeakers is the one of the user A.

The user E operates the voice button 21 when he or she wants to speak in the meeting room on the conference room screen. A signal in response to this operation (also referred to as speak signal) is sent to the system server 1 from the computer 6.

After the system server 1 receives the conference room screen and the speech content at step S13, the sequence goes to step S14, where the control module 14 determines whether the voice button 21 is operated or not. At step S14, when it is determined that the voice button 21 is operated, namely, the speak signal is received from the computer 6, the sequence goes to step S15. The control module 14 determines whether the speak signal is received from the computer 6 for the first time after the selection of the meeting room at step S12. At step S15, when it is determined that the speak signal from the computer 6 is received for the first time, the sequence goes to step S16. At step S16, the control module 14 stores the terminal information about the user E in the terminal-information memory module 15, and then the sequence goes to step S17.

At step S15, when it is determined that the reception of the speak signal from the computer 6 is not the first one, the sequence goes to step S17 skipping step S16. The control module 14 reads, from the server-information memory module 17, the data of the speech content stored as the server information, and feeds it to the media converter module 16 to convert it into display data. At step S17, the control module 14 controls the communications module 11 to transmit the speech screen in the display data format (because the communications module 11 communicates with the computer as already described).

The speech screen is received by the computer 6, and its display device 6A presents the speech screen, for example, as shown in FIG. 6A, to prompt the user E to speak. The user E is allowed to speak from the time the speech screen is presented until the end button 31 is operated.

When the user E speaks, his or her voice is converted into a voice signal by the microphone 6B, and is then sent to the system server 1 in the same way the computer 2 operates. At step S18, the system server 1 receives the voice from the computer 6 through its communications module 11, and the voice is processed in the same way the voice from the computer 2 is processed. Specifically, the voice sent from the computer 6 is transmitted to the users A through D having the computer 2, the telephone 3 and the portable telephones 4 and 5, respectively, but in their respective data formats.

The control module 14 determines at step S19 whether the end button 31 is operated on the speech screen (FIG. 6A). At step S19, when it is determined that the end button 31 is not yet operated, the sequence returns to step S18. At step S19, when it is determined that the end button 31 is operated, the sequence returns to step S13.

The system server 1 sends to the computer 6 the conference room screen along with the speech content of other users, and the conference room screen is produced referring to the terminal information stored in the terminal-information memory module 15. Once the user E spoke at the meeting room, the terminal information about the user E is stored in the terminal-information memory module 15.

The conference room screen that is transmitted to the computer 6 at step S13 is something like the one shown in FIG. 6B, which includes the user character and terminal character of the user E.

In the embodiment shown in FIG. 6B, the partition 23 encloses the user character and terminal character of the user E, indicating that the talker is the user E.

At step S20, when it is determined that the end button 22 on the conference room screen is operated, the sequence returns to step S6, causing the link to be disconnected.

Figure 7:
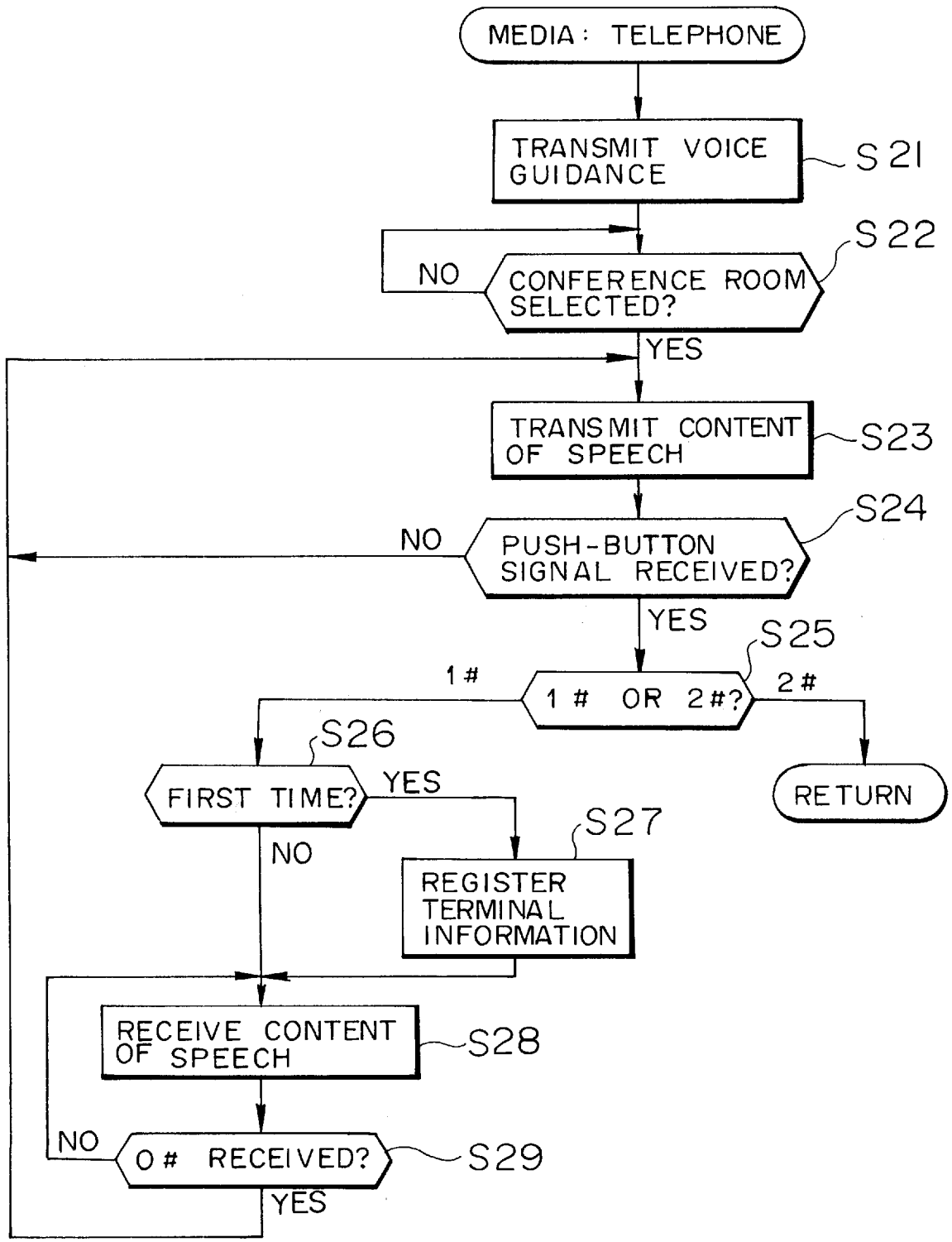
FIG. 7 is a flow diagram illustrating the detail of the step S5 of FIG. 3.

Referring now to a flow diagram shown in FIG. 7, detailed is the process at step S5 shown in FIG. 3 where the terminal is a telephone. Suppose that the user D having the portable telephone 5 is accessing to the meeting room for "ski (ABC ski resort)," which is already accessed by the user A having the computer 2, the user B having the telephone 3, and the user C having the portable telephone 4.

In this case, again, the control module 14 reads, from the server-information memory module 17, the type of meeting room (type of theme) stored as the server information, and determines the number of users now accessing to each meeting room referring to the terminal-information memory module 15. From these pieces of information, the control module 14 produces a message for guidance (also referred to as a guidance message) and converts the guidance message into telephone voice data using a voice synthesizing function in the media converter module 16. At step S21, the guidance message arranged in the telephone voice data format as described above is sent to the portable telephone 5 via the communications module 12 (because the communications module 12 receives the access from telephones).

The portable telephone 5 receives the guidance message from the system server 1 and outputs the corresponding voice. Namely, the guidance message corresponds to the menu screen. The portable telephone 5 announces, for example, "now, xx (the number users) persons have accessed to a meeting room (theme) ∘∘. To select this meeting room, dial '1#.' ΔΔ persons have accessed to a meeting room ∘∘. To select this meeting, dial '2#.'. . ."

Listening to such a message, the user D selects a meeting room he or she wants to participate. Specifically, if the meeting room the user D wants to access is the theme ski "ski (ABC ski resort)" to which users A through C have already accessed, the user D dials the number corresponding to the meeting room and the character # in succession (or presses the number and # keys in succession on a push phone). The portable telephone 5 sends to the system server 1 a push-button signal or dial-pulse signal (hereinafter collectively referred to as push-button signal) responsive to the operation of the user.

After sending the guidance message at step S21, the control module 14 in the system server 1 determines at step S22 whether the user D selects the meeting room (conference room). At step S22, when it is determined that the meeting room is not selected, step S22 is repeated. At step S22, when it is determined that the meeting room is selected, namely when the communications module 12 receives the push-button signal from the portable telephone 5, the sequence goes to step S23. The control module 14 controls the communications module 12 to send to the portable telephone 5 the speech content at the meeting room (selected by the user D) corresponding to the push-button signal.

As described above, when the system server 1 receives a voice message from one of the users who access to the same meeting room, the system server 1 sends the voice message to all other users in their respective formats. At step S23, the system server 1 sends, via the communications module 12 to a terminal from which a push-button signal is received at step S22, the voice message of the user terminals which make access to the selected meeting room. By selecting the meeting room (accessed by users A through C) at step S22, the user D can hear the speech content (voice message) of users A through C who access the meeting room.

The system server 1 also sends to the portable telephone 5 a message indicating how to speak in the meeting room and leave the meeting room (hereinafter referred to as operating procedure message). Specifically, the control module 14 reads from the server-information memory module 17 the operating procedure message stored as the server information, for example, "to speak, dial 1#, to end your speaking, dial 0#, to leave the meeting room, dial 2#" and feeds such message to the media converter module 16 to convert the operating procedure message into telephone voice data. The control module 14 controls the communications module 12 to send to the portable telephone 5 the operating procedure message in the telephone voice data format.

To speak something in the meeting room, the user D dials 1# according to the operating procedure message. The push-button signal corresponding to the dialing operation by the user D (also referred to as speak push-button signal) is sent to the system server 1 from the portable telephone 5.

At step S23, the system server 1 sends the contents of speech made in the meeting room and the above described message. The sequence goes to step S24, where the control module 14 determines whether a push-button signal is received from the portable telephone 5. At step S24, when it is determined that the push-button signal is received, the sequence goes to step S25, where the control module 14 determines whether the push-button signal corresponds to either 1# or 2#.

When it is determined at step S25 that the push-button signal from the portable telephone 5 is 1#, namely, when the user D tries speaking, the sequence goes to step S26. The control module 14 determines whether the push-button signal from the portable telephone 5 is a first one after the selection of the meeting room at step S22. When the push-button signal is determined to be the first one at step S26, the sequence goes to step S27. The control module 14 stores the terminal information about the user D in the terminal-information memory module 15, and the sequence goes to step S28. The computer 2 displays the above-described conference room screen. In this case, if the terminal information about the user D is stored in the terminal-information memory module 15 at step S27, the user character and terminal character of the user D are shown on the conference room screen on the computer 2.

At step S26, when the push-button signal from the portable terminal 5 is determined to be not the first one, the sequence goes to step S28, skipping step S27. The voice sent from the portable telephone 5 is received. The system server 1 thus receives the speech content of the user D from the time the push-button signal corresponding to 1# is received until the push-button signal corresponding to 0# is received.

When the user D speaks, his or her voice is sent in the form of telephone voice data to the system server 1 from the portable telephone 5. The system server 1 receives the voice from the portable telephone 5 through the communications module 12 at step S28, and then sends it to the users A through C having the computer 2, telephone 3 and portable telephone 4, respectively, in their respective data formats as already described.

The control module 14 determines at step S29 whether a push-button signal corresponding to 0# is received. When it is determined at step S29 that the push-button signal corresponding to 0# is not received yet, the sequence returns to step S28. At step S29, when it is determined that the push-button signal corresponding to 0# is received, the sequence returns to step S23.

When it is determined at step S25 that the push-button signal corresponding to 2# is received, the sequence returns to step S6 in FIG. 3.

The media mix meeting service provided by the network system of the present invention has been described in connection with computer and telephone terminals. Such a service may be provided to AV apparatuses and game-machine terminals, each having communications capability.

In this embodiment, the computer 2 receives a message in voice and outputs a message in voice as well. Alternatively, the computer 2 may receive a message in characters (text) and may output a message in characters (text) as well.

The operation of the system for text exchange is now discussed, focusing on the computer 2 and the telephone 3. The media converter module 16 in the system server 1 converts a message of a character string that is input by operating a keyboard connected to the computer 2, into telephone voice data, using the voice synthesizing function of the media converter module 16. The voice message transmitted from the telephone 3 is converted into computer text data (character string) using the synthesizing function of the media converter module 16.

In this embodiment, the system server 1 provides the media mix meeting service to a terminal which directly accesses the system server 1. The system server 1 may provide the same service to a terminal which makes access through the computer network 8.

The computer network 8 may be equipped with a server equivalent to the system server 1, and a message exchange described above may be performed between that server and the system server 1.

In the speaking in the meeting room, a user who starts speaking first from a silent condition may have priority in speaking. Even while a user is speaking, another user may be permitted to speak. In this case, the media converter module 16 may be provided with a function that allows a plurality of voice inputs to be combined, and converts the voice into data formats compatible with respective terminals.

According to the method and apparatus for processing information of the present invention, terminal information about a terminal which transmits and receive a message is stored. Messages from a first media and a second media are converted into data in data formats compatible with the second media and the first media, respectively. When a message sent from one terminal is sent to all other terminals according to the terminal information, the message is sent to the terminals of the first or second media, in their respective data formats. A message exchange is performed on a real-time basis between the terminals of different media.

What is claimed is:

1. An information processing apparatus for performing a process to allow terminals of a plurality of media types to transmit and receive a message, comprising:

communications means for real-time communication between a terminal of a first media and a terminal of a second media;

memory means for storing terminal information about a plurality of terminals which transmit and receive messages;

converter means for converting a message received from the first media terminal through the communications means into data in a data format of the second media terminal, and for converting a message received from the second media terminal through the communications means into data in a data format of the first media terminal; and control means for converting the message transmitted from one of the first media terminal and the second media terminal, using the converter means, and for transmitting a message on a real-time basis to the other of the first media terminal and the second media terminal, in the data formats respectively compatible with the other of the first media terminal and the second media terminal, based on the terminal information stored in the memory means.

2. An information processing apparatus according to claim 1, wherein the message transmitted from the first media terminal and the message transmitted from the second media terminal are respective voice messages different in data format, and the converter means converts the voice message from the first media terminal and the voice message from the second media terminal into a voice message in the data format of the second media terminal and a voice format in the data format of the first media terminal, respectively.

3. An information processing apparatus according to claim 1, wherein the message transmitted from the first media terminal and the message transmitted from the second media terminal are a message of text data and a voice signal, respectively, and the converter means converts the message of text data from the first media terminal into a message in a voice data format compatible with the second media terminal while converting the voice signal from the second media terminal into a message in the text data format compatible with the first media terminal.

4. An information processing apparatus according to claim 1, wherein, when one of the first media terminal and the second media terminal is provided with a display device, the control means recognizes, based on the terminal information stored in the memory means, the number of terminals which transmit and receive the message, and controls the communication means to transmit communication status data for presenting on the display device a screen indicating the number of terminals, to the one of the first media terminal and the second media terminal having the display device.

5. An information processing apparatus according to claim 4, wherein the communication status data comprises character image data representing a terminal of a user who transmits and receives the message.

6. An information processing apparatus according to claim 5, wherein the character image is set by the user.

7. An information processing apparatus according to claim 1, wherein the first media terminal and the second media terminal are a computer and a telephone, respectively.

8. An information processing method for performing a process to allow terminals of a plurality of media types to transmit and receive a message, comprising the steps of:

storing terminal information about terminals which transmit and receive a message;

converting messages from a first media terminal and a second media terminal into messages in data formats of the second media terminal and the first media terminal, respectively; and transmitting a message on a real-time basis coming from one of the terminals to the other terminals, in the data formats respectively compatible with the other terminals, based on the terminal information.

* * * * *